AUTOMATIC DUAL REPRODUCING HEAD FOR TAPE RECORDING DEVICE

Filed June 30, 1958 2 Sheets-Sheet 1

INVENTOR.
SIDNEY O. SAMPSON
BY
[signature]
ATTORNEY

AUTOMATIC DUAL REPRODUCING HEAD FOR TAPE RECORDING DEVICE

Filed June 30, 1958 2 Sheets-Sheet 2

INVENTOR.
SIDNEY O. SAMPSON
BY
ATTORNEY

United States Patent Office 2,952,746 Patented Sept. 13, 1960

2,952,746

AUTOMATIC DUAL REPRODUCING HEAD FOR TAPE RECORDING DEVICE

Sidney O. Sampson, 216 E. 31st St., New York, N.Y.

Filed June 30, 1958, Ser. No. 745,593

7 Claims. (Cl. 179—100.2)

This invention relates to the art of recording devices and particularly concerns an improved magnetic tape recording device especially adapted for recording and reproducing sound automatically.

According to the invention there is provided a dual recording head assembly. One set of heads serves for recording and reproducing audio signals on and from one channel of a dual channel tape and a second set of heads records and reproduces audio signals on and from the other channel of the tape. The tape is provided with metalized or electrically conductive leaders or trailers on opposite ends for coaction with sensing means and a solenoid operated motor controlling device. The solenoid is connected in a switching system and so arranged that the device will operate automatically to reproduce sound continuously from the two channels of the tape in turn. The switching system permits the device to record sound on both channels of the tape. After recording upon one channel the direction of motion of the tape is automatically reversed so that recording continues on the second channel. After completion of recording on the second channel, the device stops the motion of the tape. The device may be manually operated to control the motion of the tape at will.

It is therefore a principal object of the invention to provide a tape recorder device adapted for automatically reproducing signals continuously from a dual channel tape.

It is a further object to provide a tape recorder device adapted for automatically recording signals continuously on a dual channel tape, or to record signals automatically on each channel in turn of a dual channel tape and to stop recording automatically when recording on the two channels is completed.

It is a still further object to provide a tape recorder device adapted for automatically reversing the direction of travel of a dual tape while continuously recording or reproducing signals on or from the tape, the tape being subject to manual control between its ends of travel in either direction.

It is a still further object to provide a solenoid operated switch arranged to coact with sensing means actuated by electrically conductive leaders or trailers on a tape in a tape recorder for automatically reversing the direction of travel of the tape.

It is another object to provide a head assembly for a tape recorder of the character described in which recording-reproducing heads are disposed in a vertically stacked array with erase heads disposed adjacent to and ahead of each of the recording-reproducing heads in the normal direction of travel of the dual channel tape.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
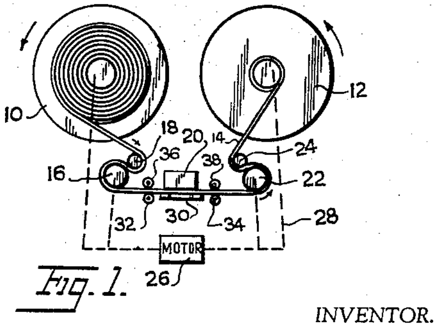
Fig. 1 is a top plan view of a tape and reel assembly which may be employed in the device.

Referring first to Fig. 1, there is shown a pair of reels 10, 12. Reel 10 is serving as the supply reel and reel 12 is serving as the take-up reel for the tape 14. The tape is threaded between a capstan 16 and tension roller 18 on one side of head assembly 20 and another pair of tension rollers 22 and 24, of which roller 22 may be another capstan which is active to drive the tape when capstan 16 is idle and vice versa. The reels and capstans are driven by a motor 26 shown in block form. The drive connection 28 between the reels, capstans and motor is conventional and is thus shown only schematically by dotted lines in the drawing. Pressure pad 30 presses the tape against the head assembly 20. Two sensing rollers 32, 34 are provided at opposite sides of the head assembly. These rollers coact with idler rollers 36 and 38, respectively, for freely passing the tape between them.

Figure 2:
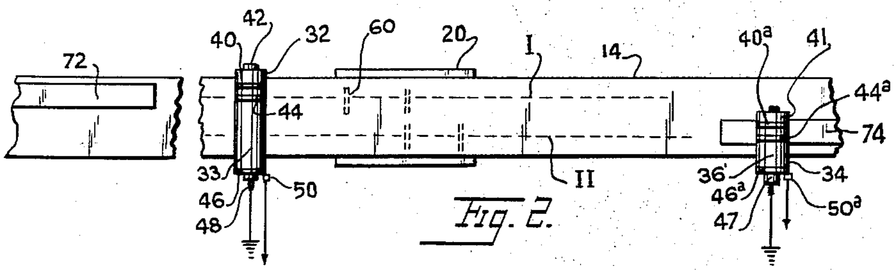
Fig. 2 is an elevational view, partially schematic, of a portion of a dual track tape and dual head in operation according to the invention.
Figure 3:
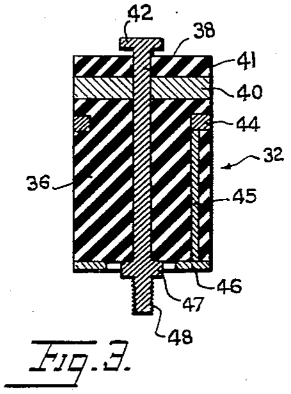
Fig. 3 is a longitudinal sectional view of a sensing element employed in the device.

Rollers 32 and 34, as best shown in Figs. 2 and 3, each includes a cylindrical resilient rubber body 36 or 36'. A metal post 38 passes through body 36 or 36'. At one end of the body is mounted a metal disk 40 or 40ª which extends out radially flush with the outer surface of body 36 or 36'. A rubber disk 41 may be secured to the top of disk 40 or 40ª under head 42 of the post.

Embedded in each of bodies 36 and 36' is a metal ring 44 or 44ª which is spaced from disks 40 and 40ª. This metal ring is connected via a wire or metal electrical conductor 45 to another ring 46 or 46ª secured to the bottom of body 36 or 36'. Post 38 has a flange 47 and a threaded end 48 for mounting on the chassis frame of a tape recorder and to provide a ground connection to disk 40 or 40ª. Rings 46, 46ª are adapted to be contacted during rotation of the rollers by stationary contact elements 50 or 50ª connected in the circuit of the device which will be described in connection with Fig. 8. Body 36' of roller 34 is smaller than the body 36 of roller 32 but the rollers are otherwise of identical construction. The open circuited disk 40 or 40ª and ring 44 or 44ª of each sensing roller are so spaced that they can be electrically connected when a metal leader or trailer element 72 or 74 carried on opposite ends of the tape 14 contacts them. The metal leaders or trailers are metal films carried preferably on the back of the tape. Roller 32 is disposed transversely to the direction of motion of the tape and its disk and ring 40, 44 are so located that only the trailer or leader 72 in the upper channel I will contact this disk and ring. Roller 34 has its disk and ring 40ª, 44ª so located that only the trailer or leader 74 in the lower channel II will contact them. It is preferred that the metal strips or films be located on the trailing ends of the respective channels when used with the device shown in Fig. 8.

Figure 5:
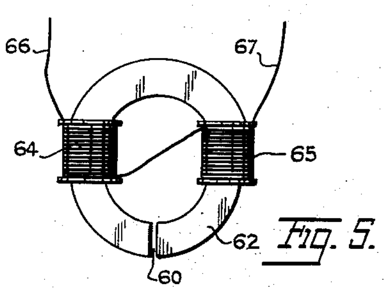
Fig. 5 is a plan view of one of the magnetic heads of the dual head assembly.
Figure 6:
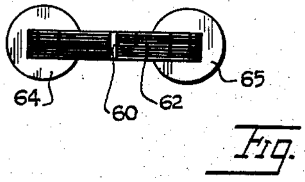
Fig. 6 is an elevational view of the magnetic head of Fig. 5.
Figure 4:
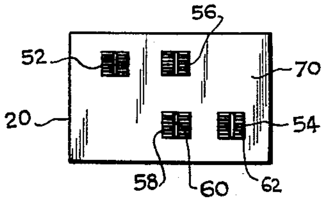
Fig. 4 is an elevational view of a dual head assembly employed in the invention.

Head assembly 20, as best shown in Fig. 4, includes upper and lower erase heads 52 and 54 and record-reproduce heads 56, 58. Heads 56, 58 are stacked vertically in line with each other. Each head presents an air gap 60 to the tape as best shown in Figs. 2, 5 and 6. The air gap 60 is formed by a split in a pile of flat annular rings or plates 62. The piled rings are each encircled by two interconnected coils 64, 65 and are magnetized or demagnetized by electric current applied via conductor terminals 66, 67.

Figure 7:
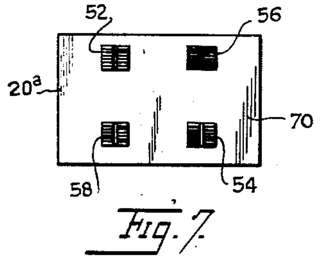
Fig. 7 is an elevational view similar to Fig. 4 of another dual head assembly which may be used in the device.

In Fig. 7, head assembly 20[a] has erase head 52 disposed vertically above record-reproduce head 58 and record-reproduce head 56 is disposed vertically above erase head 54. The groups of heads in each assembly are embedded in a block 70 made of plastic or other dielectric, non-magnetic material.

Figure 8:
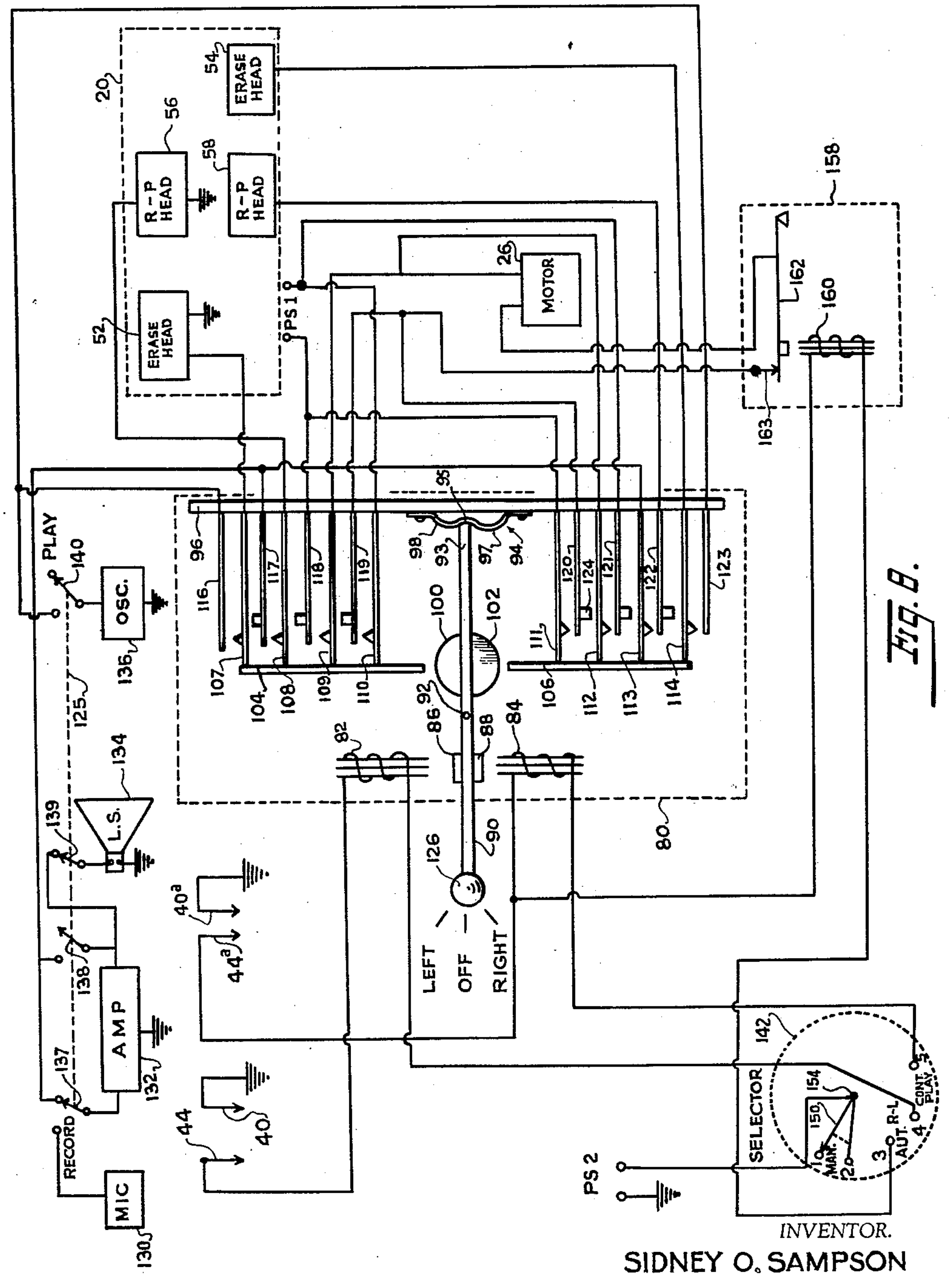
Fig. 8 is a schematic diagram of the device embodying the invention.

In the schematic arrangement of the device shown in Fig. 8, there is provided a solenoid 80. This solenoid has two electromagnet coils 82, 84 disposed in axial alignment. The coils are arranged to attract alternately armatures 86 and 88 carried on opposite sides of a dielectric bar 90. The bar pivots on a stationary pin 92. The inner end 93 of the shaft is disposed to engage in the central recess 95 in the double bowed spring 94 mounted on an insulator plate 96. When armature 86 is attracted by coil 82, the shaft end 93 detents out of the recess in spring 94 to a downward position at bow 97. Attraction of armature 88 by coil 84 pivots bar 90 and detents shaft end 93 past the central recess to an upper position above bow 98.

Bar 90 carries upper and lower projecting leaves 100, 102 positioned to push switch bars 104, 106, respectively, upward and downward. Bar 104 is spaced from plate 96 by spring contact elements 107—110. Bar 106 is spaced from plate 96 by spring contact elements 111—114. Plate 96 carries spring contact elements 116—123 each spaced from one of spring contact elements 107—114. Rectangular insulator elements 124 separate the several pairs of spring contact elements. A knob 126 is provided on the outer free end of bar 90 for manual actuation of the switch contacts independently of the coils of the solenoid.

Motor 26 is connected to power supply terminals PS1 via switch elements 109, 118 and 119, 110 when the solenoid bar 90 is turned to the lower or Right position. The connections of the motor to power supply PS1 are reversed when the solenoid bar is turned to the upper or Left position so that switch elements 121, 112 and 120, 106 are connected to the respective power supply terminals.

Erase head 54 is connected to element 114. The record-reproduce or record-play (R–P) head 58 is connected to element 122. Erase head 52 is connected to element 107 and record-play head 56 is connected to element 108.

The device is provided with a microphone 130, amplifier 132 and loud-speaker 134. An oscillator 136 for driving the erase heads and erasing magnetization of the tape is also provided. A Record-Play switch 125 is provided for manual actuation in setting the device for recording or playing operations as desired. This switch has ganged arms or poles 137—140. Each pole has two contact positions so that it acts as a single pole double throw switch. The poles are shown in the Play position in Fig. 1, and can be thrown to the left into Record position.

A Selector switch 142 is provided for the device. This switch has five contact points (1–5) equally spaced from each other. Double arms 150, 152 are rotatable together in a fixed angular position on shaft 154. They are electrically connected to shaft 154 which is connected to one terminal of power supply PS2. The other terminal of power supply PS2 is connected to ground. Contact points 1 and 2 are open. Contact point 3 is connected to coil 160 of a relay 158. Contact points 4 and 5 are connected to coils 82 and 84, respectively. The relay 158 has fixed and movable contacts 163, 162. These contacts are normally closed. They are connected in the power supply circuit of motor 26. Fixed contact 163 is connected to element 119 and movable contact 162 is connected to the motor 26.

Roller contacts 40 and 40[a] are connected to ground. Roller contact 44 is connected to solenoid coil 82 and contact 44[a] is connected to coil 84.

In operation of the device, the solenoid bar 90 may be placed manually in the Off or center position which will open all contact elements in the solenoid-switch 80 and the power supply circuit of motor 26 will be broken so that the travel of tape 14 shown in Figs. 2 and 4 is stopped.

When selector switch 142 is in Manual position at points 1, 2, as shown in Fig. 8, the power supply to both solenoid coils 82 and 84 is effectively cut off so that the recorder motor 26 operates only under manual control of bar 90. Moving the bar up to Left position results in driving the tape from left to right or from reel 12 to 10 and moving the bar down to Right position results in driving the tape from right to left or from reel 10 to reel 12. In the Left position contacts 113, 122 and 114, 123 of the motor power supply circuit are closed. In Right position contacts 110, 119 and 109, 118 of the motor power supply circuit are closed.

If the Record-Play switch 125 is in Play position as shown in Fig. 8, while the solenoid-switch is in Left position, then head 58 is connected to the input of amplifier 132 via switch arm 137 and elements 113, 122. The loud-speaker 134 is then connected to the output of the amplifier via switch arm 139. Oscillator 136 is disconnected from the erase heads. If the solenoid-switch is set to Right position while the Record-Play switch is at Play, then head 56 is connected to amplifier 132 via elements 108, 117 instead of head 58.

If the Record-Play switch is at Record, the microphone 130 is connected directly to the amplifier via switch arm 137 and either head 56 or 58 is connected to the output of the amplifier via switch arm 138 depending on whether the solenoid-switch 80 is in Right or Left position. In Play position of switch 125, the oscillator 136 is connected via arm 140 to erase head 52 via elements 116, 107 or to erase head 54 via elements 114, 123 depending on whether the solenoid-switch is in Right or Left position respectively.

If the Selector switch is actuated to place arms 150, 152 at switch points 4 and 5, respectively, then the device is set for continuous play. Under this condition, when the tape completes its travel to the right contacts 40, 44 will be closed as trailer 72 reaches roller 32 and coil 82 will be energized. This will automatically throw bar 90 to Left position and bar 106 will be pushed down to close the contacts controlled by this bar. When these contacts close, the motor power supply circuit will be reversed and the tape will be driven to the left from reel 12 to reel 10. When the tape trailer 74 reaches roller 34, contacts 40[a], 44[a] will be closed and coil 84 will be energized to throw bar 90 to Right position. Then bar 104 will be pushed up to close the contacts controlled by this bar. The closing of these contacts will reverse the power supply circuit to the motor and the tape will be driven automatically to the right. The automatic reversal of travel of the tape will occur at the end of each pass of the tape while the Selector switch is in Continuous Play position.

The Selector switch 142 is arranged to provide for a full automatic right-left traverse of the tape when switch arms 150, 152 are set at switch points 3 and 4, respectively (Aut. R–L). This position of switch 142 may be employed when switch 125 is set at Record position. Bar 90 will be moved manually down. Tape 14 will be wound up on reel 10. Switch 142 will be set to Aut. R–L at contact points 3, 4. The tape will travel to the right from reel 10 until trailer 72 closes contacts 40, 44. To start the movement of the tape the reels should be turned manually to clear trailer 74 from contacts $40^a$, $44^a$. Coil 82 will become energized when contacts 40, 44 are closed by trailer 72 and bar 90 will be thrown to Left position. The motor will reverse automatically and tape 14 will then travel to the left until trailer 74 reaches and closes contacts $40^a$, $44^a$ whereupon the motor will be stopped automatically. This occurs because relay coil 160 of relay 158 is energized by power supply PS2 via switch arm 150, contact point 3, and contacts $40^a$, $44^a$, so that contacts 162, 163 of relay 158 open. Coil 84 does not become energized because of the open contact point 5 in switch 142. Thus the tape can be impressed fully with audio signals recorded thereon via microphone 130, amplifier 132 and heads 56 and 58 in turn. The tape is automatically stopped when it has been impressed with a full recording on both channels I and II.

It will be noted that when trailers 72 and 74 are clear of the sensing rollers carrying contacts 40, 44 and $40^a$, $44^a$, then the automatic control effected by solenoid 80 on the motor is deactivated. The travel of the tape past the heads at all points between the ends thereof is under manual control of the switch contacts by means of bar 90 and knob 126. This condition obtains regardless of the position of the switch arms 150, 152 of the Selector switch 142.

If desired, separate recording and reproducing heads can be substituted for the individual record-reproduce heads 56, 58. The use of such heads will not change the essential operation of the motor control circuit described.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. A tape recorder, comprising motor drive means for drawing a dual channel tape from end to end thereof in opposite directions, a head assembly including first magnetic heads disposed on one level for recording and reproducing on one channel of the tape and second magnetic heads disposed on another level for recording and reproducing on the other channel of the tape, means for deactivating the first heads when the second heads are active and for deactivating the second heads when the first heads are active, said tape having electrically conductive trailer elements at opposite ends thereof, sensing means disposed to be contacted by the trailer elements at each end of travel of the tape, motor reversing means in circuit with the trailer elements adapted to change the direction of rotation of said motor drive means for reversing the direction of travel of the tape at each end of travel in any direction, said motor reversing means including a switch having two sets of contacts, a manually operable switch bar having a spring-biased detent control for closing selectively one of the two sets of contacts and for holding the contacts open, and a selector switch for rendering said drive means selectively subject to manual operation of said switch bar and to automatic continuous drive of the tape and reversal of travel thereof at each end of travel.

2. A tape recorder, comprising motor drive means for drawing a dual channel tape from end to end thereof in opposite directions, a head assembly including first magnetic heads disposed on one level for recording and reproducing on one channel of the tape and second magnetic heads disposed on another level for recording and reproducing on the other channel of the tape, means for deactivating the first heads when the second heads are active and for deactivating the second heads when the first heads are active, said tape having electrically conductive trailer elements at opposite ends thereof, sensing means disposed to be contacted by the trailer elements at each end of travel of the tape, motor reversing means in circuit with the trailer elements adapted to change the direction of rotation of said motor drive means for reversing the direction of travel of the tape at each end of travel in any direction, said motor reversing means including a switch having two sets of contacts, a switch bar having a spring-biased detent for closing selectively one of the two sets of contacts and for holding the contacts open, a solenoid means for automatically throwing the switch bar to close selectively one of the two sets of contacts, and a selector switch in circuit with said solenoid means for rendering said drive means selectively subject to manual operation of said switch bar, to continuous drive of the tape and reversal of travel thereof at each end of travel, and to automatic reversal of travel of the tape at the end of travel in one direction and automatic stop at the end of travel in the opposite direction.

3. A tape recorder, comprising motor drive means for drawing a dual channel tape from end to end thereof in opposite directions, a head assembly including first magnetic heads disposed on one level for recording and reproducing on one channel of the tape and second magnetic heads disposed on another level for recording and reproducing on the other channel of the tape, means for deactivating the first heads when the second heads are active and for deactivating the second heads when the first heads are active, said tape having electrically conductive trailer elements at opposite ends thereof, sensing means disposed to be contacted by the trailer elements at each end of travel of the tape, motor reversing means in circuit with the trailer elements adapted to change the direction of rotation of said motor drive means for reversing the direction of travel of the tape at each end of travel in any direction, said motor reversing means including a switch having two sets of contacts, a switch bar having a spring-biased detent for closing selectively one of the two sets of contacts and for holding the contacts open, a solenoid means for automatically throwing the switch bar to close selectively one of the two sets of contacts, said solenoid means including two axially aligned electromagnetic coils, said coils being in circuit with said sensing means and disposed adjacent the switch bar, and a selector switch in circuit with said solenoid means for rendering said drive means selectively subject to manual operation of said switch bar, to continuous drive of the tape and reversal of travel thereof at each end of travel, and to automatic reversal of travel of the tape at the end of travel in one direction and automatic stop at the end of travel in the opposite direction.

4. A tape recorder, comprising motor drive means for drawing a dual channel tape from end to end thereof in opposite directions, a head assembly including first magnetic heads disposed on one level for recording and reproducing on one channel of the tape and second magnetic heads disposed on another level for recording and reproducing on the other channel of the tape, means for deactivating the first heads when the second heads are active and for deactivating the second heads when the first heads are active, said tape having electrically conductive trailer elements at opposite ends thereof, sensing means disposed to be contacted by the trailer elements at each end of travel of the tape, motor reversing means in circuit with the trailer elements adapted to change the direction of rotation of said motor drive means for reversing the direction of travel of the tape at each end of travel in any direction, said motor reversing means including a switch having two sets of contacts, a switch bar having a spring-biased detent for closing selectively one of the two sets of contacts and for holding the contacts open, a solenoid means for automatically throwing the switch bar to close selectively one of the two sets of contacts, said solenoid means including two axially aligned electromagnetic coils, said coils being in circuit with said sensing means and disposed adjacent the switch bar, said sensing means comprising two rollers, each roller carrying spaced contacts adapted to be electrically connected by one of the trailer elements on the tape, and a selector switch in circuit with said solenoid means for rendering said drive means selectively subject to manual operation of said switch bar, to continuous drive of the tape and reversal of travel thereof at each end of travel, and to automatic reversal of travel of the tape at the end of travel in one direction and automatic stop at the end of travel in the opposite direction.

5. A tape recorder, comprising motor drive means for drawing a dual channel tape from end to end thereof in opposite directions, a head assembly including first magnetic heads disposed on one level for recording and reproducing on one channel of the tape and second magnetic heads disposed on another level for recording and reproducing on the other channel of the tape, means for deactivating the first heads when the second heads are active and for deactivating the second heads when the first heads are active, said tape having electrically conductive trailer elements at opposite ends thereof, sensing means disposed to be contacted by the trailer elements at each end of travel of the tape, motor reversing means in circuit with the trailer elements adapted to change the direction of rotation of said motor drive means for reversing the direction of travel of the tape at each end of travel in any direction, said motor reversing means including a switch having two sets of contacts, a switch bar having a spring-biased detent for closing selectively one of the two sets of contacts and for holding the contacts open, a solenoid means for automatically throwing the switch bar to close selectively one of the two sets of contacts, said solenoid means including two axially aligned electromagnetic coils, said coils being in circuit with said sensing means and disposed adjacent the switch bar, a power supply, and a selector switch having two ganged switch arms connected to one terminal of the power supply, said selector switch having a pair of contact points respectively connected to said coils of the solenoid means, whereby setting of the selector switch arms to said contact points causes said drive means to be operated continuously and causes the direction of travel of the tape to be reversed repeatedly each time said sensing means contacts one of said trailer elements, said selector switch having another contact point connected to said solenoid means, whereby setting one of said arms to the other contact point disables continuous operation of the drive means and renders the drive means subject to control only by said switch bar.

6. A tape recorder, comprising motor drive means for drawing a dual channel tape from end to end thereof in opposite directions, a head assembly including first magnetic heads disposed on one level for recording and reproducing on one channel of the tape and second magnetic heads disposed on another level for recording and reproducing on the other channel of the tape, means for deactivating the first heads when the second heads are active and for deactivating the second heads when the first heads are active, said tape having electrically conductive trailer elements at opposite ends thereof, sensing means disposed to be contacted by the trailer elements at each end of travel of the tape, and motor reversing means in circuit with the trailer elements adapted to change the direction of rotation of said motor drive means for reversing the direction of travel of the tape at each end of travel in any direction, said motor reversing means including a switch having two sets of contacts, a switch bar having a spring-biased detent for closing selectively one of the two sets of contacts and for holding the contacts open, and a solenoid means for automatically throwing the switch bar to close selectively one of the two sets of contacts, said solenoid means including two axially aligned electromagnetic coils, said coils being in circuit with said sensing means and disposed adjacent the switch bar, a power supply, and a selector switch having two ganged switch arms connected to one terminal of the power supply, said selector switch having a pair of contact points respectively connected to said coils of the solenoid means, whereby setting of the selector switch arms to said contact points causes said drive means to be operated continuously and causes the direction of travel of the tape to be reversed repeatedly each time said sensing means contacts one of said trailer elements, said selector switch having another contact point, and a relay having a coil connected to said other contact point, said relay having fixed and movable contacts in series circuit with a power supply circuit of said motor drive means, whereby setting of the selector switch arms to one of the first-named contact points and said other contact point, causes said drive means to drive the tape in one direction, then reverse the direction of travel of the tape and finally stop the movement of the tape at the end of travel in the reversed direction.

7. A tape recorder, comprising means for drawing a dual channel tape from end to end thereof in opposite directions, a head assembly including a first erase head and first record-reproduce head disposed on one level for recording and reproducing on one channel of the tape and a second erase head and a second record-reproduced head disposed on another level for recording and reproducing on the other channel of the tape, means for deactivating the first heads when the second heads are active and for deactivating the second heads when the first heads are active, and selector means for selectively controlling continuous reversing the direction of travel of the tape at each end of travel in any direction and at any point between the ends of tape travel, said selector means including two sets of switch contacts and a three-position detent bar for selectively closing one of the two sets of contacts and for holding the contacts open.

References Cited in the file of this patent

UNITED STATES PATENTS

| | | |
|---|---|---|
| 2,422,143 | Somers et al. | June 10, 1947 |
| 2,514,578 | Heller et al. | July 11, 1950 |
| 2,552,788 | Hoover | May 15, 1951 |
| 2,694,110 | Roberts | Nov. 9, 1954 |
| 2,706,638 | Bruderlin | Apr. 19, 1955 |
| 2,864,894 | Dale | Dec. 16, 1958 |